US006554875B2

(12) United States Patent
Kimura et al.

(10) Patent No.: US 6,554,875 B2
(45) Date of Patent: Apr. 29, 2003

(54) PROCESS FOR MANUFACTURING ELECTRIC DOUBLE-LAYER CAPACITOR

(75) Inventors: Fuminori Kimura, Tokyo (JP); Takeshi Kobayashi, Sowa-machi (JP); Kouji Kimura, Sowa-machi (JP); Masahiko Shimizu, Yokohama (JP)

(73) Assignees: Japan Vilene Co., Ltd., Tokyo (JP); Power Systems Co., Ltd., Yokohama (JP)

( * ) Notice: Subject to any disclaimer, the term of this patent is extended or adjusted under 35 U.S.C. 154(b) by 329 days.

(21) Appl. No.: 09/739,005

(22) Filed: Dec. 19, 2000

(65) Prior Publication Data

US 2001/0005928 A1 Jul. 5, 2001

(30) Foreign Application Priority Data

Dec. 24, 1999 (JP) ............................................. 11-366540

(51) Int. Cl.$^7$ .............................. H01G 9/00; H01G 9/02; H01M 2/16
(52) U.S. Cl. ...................... 29/25.03; 361/512; 429/247; 429/248; 429/249
(58) Field of Search .............................. 29/25.01–25.03; 361/502, 512; 429/247–249, 253, 254

(56) References Cited

U.S. PATENT DOCUMENTS

| 4,330,602 | A | | 5/1982 | O'Rell et al. |
| 5,100,723 | A | * | 3/1992 | Iwasaki et al. |
| 5,202,178 | A | * | 4/1993 | Turner |
| 5,204,197 | A | * | 4/1993 | Takai et al. |
| 6,403,265 | B1 | * | 6/2002 | Tanaka et al. |
| 6,411,497 | B2 | * | 6/2002 | Kimura et al. |

FOREIGN PATENT DOCUMENTS

| JP | A 11-008169 | 1/1999 |

* cited by examiner

Primary Examiner—Ha Tran Nguyen
(74) Attorney, Agent, or Firm—Oliff & Berridge, PLC

(57) ABSTRACT

A process for manufacturing an electric double-layer capacitor with an excellent property of preventing a short circuit between the electrodes, a better ionic permeability and a high strength is provided, said process comprising using, as a separator, a fiber sheet containing a fiber having fibrils and a fine polyester fiber having a fineness of not more than 0.45 dtex (decitex) and drying the separator at a specific temperature.

2 Claims, No Drawings

PROCESS FOR MANUFACTURING ELECTRIC DOUBLE-LAYER CAPACITOR

FIELD OF THE INVENTION

The present invention relates to a process for manufacturing an electric double-layer capacitor.

BACKGROUND OF THE INVENTION

An electric double-layer capacitor has a relatively high capacity; moreover, it has a long life and a capability of being quickly charged and discharged. Therefore, it has been used not only for conventional applications such as leveling of power sources and absorption of noises but also as a memory backup power source for personal computers as well as a supplement or substitute for secondary batteries. In recent years, it has been expected to be used as a secondary battery for electric automobiles.

This electric double-layer capacitor has such a structure that a pair of electrodes is dipped in an electrolyte solution. When a voltage is applied to this electric double-layer capacitor, ions having an opposite sign to an electrode will be distributed near the electrode to form a layer of the ions while charges having an opposite sign to the ion will be accumulated within the electrode. Then, when a load is placed across the electrodes, the charges within the electrode will be discharged and, at the same time, the ions distributed near the electrode will leave therefrom whereby a neutral state will return.

When a pair of electrodes touch in such an electric double-layer capacitor, the formation of an ion layer near the electrode becomes difficult. Therefore, a separator is usually placed between each electrode pair.

An electric double-layer capacitor with the above-mentioned structure, such as a nonaqueous solution type electric double-layer capacitor where the electrolyte is a nonaqueous solution, can be manufactured as follows:

(1) after materials, i.e. a current collector electrode, an electrode and a separator, are each independently heat dried in a vacuum, those materials are assembled to manufacture an electrode group. Next, the electrode group is inserted into a case followed by impregnation with an electrolyte in a vacuum. Then, the case is sealed to give a nonaqueous solution type electric double-layer capacitor is prepared. According to this method, it would be possible to manufacture an electric double-layer capacitor having a high withstand voltage and an electric double-layer capacitor having a high energy density. However, in this method, there are problems that the manufacture is troublesome since each of the materials is to be heat dried in a vacuum and a big space is needed since plural drying apparatuses are required.

Another method for the manufacture of an electric double-layer capacitor is as follows:

(2) the materials, i.e. the current collector electrode, the electrode and the separator, are assembled together to prepare an electrode group which is subjected to heat drying in a vacuum. Then, the electrode group is inserted into a case, followed by impregnation with an electrolyte in a vacuum. Thereafter, the case is sealed to give a nonaqueous type electric double-layer capacitor. According to this method, heat drying in a vacuum is carried out after fabrication of the electrode group and, therefore, the manufacturing processes can be simplified and the number of drying apparatuses can be reduced whereby a big space is unnecessary. However, because there are varieties in heat resistance among the constituent materials for the electrode group (i.e., among the current collector electrode, the electrode and the separator), heat-drying in a vacuum should be carried out at such a temperature that each material will not be deteriorated. Unfortunately, water cannot be sufficiently removed even by heat drying in a vacuum at such a temperature and, therefore, it is difficult to manufacture an electric double-layer capacitor having a high withstand voltage and an electric double-layer capacitor having a high energy density. On the contrary, when the thermal drying in a vacuum is carried out at such a temperature that water can be well removed, there is a problem that the separator (such as a separator made up of a polypropylene fiber or a cellulose fiber) is significantly deteriorated due to fusion or carbonization, thereby causing a short circuit. As a result, the resulting prior art separator is actually unusable.

SUMMARY OF THE INVENTION

The present invention has been made for solving the above-mentioned problems. An object of the present invention is to provide a process capable of manufacturing an electric double-layer capacitor having a high withstand voltage, an electric double-layer capacitor having a high energy density or an electric double-layer capacitor having a high capacity in an easy manner and without taking up much space.

The present invention relates to a process for the manufacture of an electric double-layer capacitor (hereinafter, referred to as "capacitor"), that is, a process for manufacturing an electric double-layer capacitor, said process including the steps of inserting an electrolyte and an electrode group assembled from a current collector electrode, an electrode and a separator into a case, and sealing the case, which comprises the characteristic steps of:

using, as the separator, a fiber sheet comprising a fiber having fibrils and formed from a resin having a melting or carbonizing temperature of not lower than 300° C. and a fine fiber having a fineness of not more than 0.45 dtex (decitex) and formed from a resin having a softening temperature of not lower than 200° C. and, after assembling of the electrode group, drying the current collector electrode, the electrode and the separator at the temperature which is lower than the softening temperature of a resin having the lowest softening temperature among the constituent resins for the fibers comprised in the separator but not lower than the boiling point of water.

As a result of an intensive investigation, the present inventors have found that, when an electrode group is assembled from a current collector electrode, an electrode and a specific separator and then dried even for a long period (such as 5 hours or longer) at the temperature higher than the boiling point of water but lower than the softening point of a resin having the lowest softening point among the constituent resins for the fibers contained in the above separator, water can be well removed without deterioration of the specific separator whereby it is possible to manufacture an electric double-layer capacitor having a high withstand voltage, an electric double-layer capacitor having a high energy density or an electric double-layer capacitor having a high capacity in a simple manner without occupying much space.

When no constituents for the above separator are thermally fused, the separator is free from forming a coat, thereby achieving an excellent ionic permeability. As a result, it is possible to manufacture electric double-layer capacitors having higher capacity.

DETAILED DESCRIPTION OF THE INVENTION

The characteristic feature in the capacitor-manufacturing process of the present invention resides in using a specific separator because the specific separator is not deteriorated by heat even when constituent materials are dried (such as heat dried in a vacuum) after the fabrication of an electrode group whereby water can be thoroughly removed with the result that it is possible to manufacture electric double-layer capacitors having a high withstand voltage, electric double-layer capacitors having a high energy density or electric double-layer capacitors having a high capacity in an easy, simple, convenient manner without occupying much space.

The specific separator consists of a fiber sheet containing a fibril-containing fiber formed from a resin having a melting or carbonizing temperature of not lower than 300° C. (hereinafter, referred to as "fibril fiber") and a fine fiber having a fineness of not more than 0.45 dtex (decitex) and formed from a resin having a softening temperature of not lower than 200° C.

The separators are capable of having a densified structure by entangling the fibrils of the fibril fiber, thereby providing not only an excellent strength but also an excellent property of preventing the short circuit.

The fibril fiber is a fiber wherein numerous fine fibers are formed from one fiber. The fibril fiber may be composed of fine fibers alone or may contain portions forming a bundle of fine fibers, together with the fine fibers. When a fibril fiber containing portions forming a bundle of fine fibers in addition to the fine fibers is contained therein as in the latter case, it not only has an excellent strength but also shows an excellent ionic permeability due to a synergistic action with the fine fiber as mentioned hereinbelow. Therefore, it can be appropriately used.

Since the fibril fiber is formed from a resin having a melting or carbonizing temperature of not lower than 300° C., it is hardly deteriorated by heat even when dried (such as thermally dried in a vacuum) after the fabrication of an electrode group.

The resin having a melting temperature of not lower than 300° C. includes, for example, polytetrafluoroethylenes, polyphenylene sulfides, etc. The resin having a carbonizing temperature of not lower than 300° C. includes, for example, meta-type aromatic polyamides, para-type aromatic polyamides, polyamideimides, aromatic polyether amides, polybenzimidazoles, all-aromatic polyesters, etc. Among them, the meta-type aromatic polyamides and the para-type aromatic polyamides can be appropriately used due to their good affinity to the electrolyte. The para-type aromatic polyamides having a higher carbonizing temperature are more preferable.

The term "melting temperature" as used herein refers to a temperature determined from a differential thermal analysis curve (DTA curve) obtained by a differential thermal analysis as prescribed by JIS K 7121. The term "carbonizing temperature" as used herein refers to a temperature determined by means of a thermogravimetric measurement as prescribed by JIS K 7120.

Such a fibril fiber is contained in the fiber sheet at not less than 20 mass %, and more preferably not less than 50 mass %, so as to give not only an excellent strength but also an excellent property of preventing the short circuit.

On the other hand, in view of the relation to the fine fiber which will be mentioned hereinbelow, it is preferably not more than 95 mass %, and more preferably not more than 90 mass %.

It is not necessary that fibril fibers of one kind are contained in the fiber sheet but it is allowable that fibril fibers of two or more kinds are contained therein. When fibril fibers of two or more kinds are contained, their total amount is preferably within the above-mentioned range.

The separator of the present invention contains fine fibers having a fineness of not more than 0.45 dtex and formed from a resin having a softening temperature of not lower than 200° C. in combination with fibril fibers as aforementioned. Therefore, it is possible to form fine micropores having an excellent ionic permeability. In addition, even when dried (such as heat dried in a vacuum) after assembling of an electrode group, such a deterioration by heat hardly takes place.

When the fineness of the fine fiber exceeds 0.45 dtex, the formed pore diameter tends to become big and the preventive property for short circuiting also tends to become significantly bad. The fineness is more preferably not more than 0.35 dtex, still more preferably not more than 0.25 dtex, and most preferably not more than 0.15 dtex. Although there is no particular limitation for the lower limit regarding the fineness of the fine fiber, it is preferable to be around 0.10 dtex. The term "fineness" as used herein refers to a value obtained by the Method A as prescribed by JIS L 1015.

Since this fine fiber is formed from the resin having a softening point of not lower than 200° C., it is hardly deteriorated by heat even when dried (such as thermally dried in a vacuum) after the fabrication of an electrode group.

The resin constituting the fine fiber includes, for example, Nylon 66, polyester resins, acrylate resins, polyvinyl alcohols, etc. Among them, those formed from polyester resins having the highest softening temperature are preferable.

The term "softening temperature" as used herein refers to a temperature giving the initiating point of a melting endothermic curve in a DSC curve obtained by a heat flux differential scanning calorimetry (DSC; rising rate: 10° C./minute) as prescribed by JIS K 7121.

The fiber length of the fine fiber according to the present invention is not particularly limited but varies depending upon the embodiments of the fiber sheet. When the fiber sheet of the present invention is composed of an appropriate wet-laid nonwoven fabric, the fiber length is preferably about 1 to 25 mm, or more preferably about 3 to 20 mm. The fiber length as used herein refers to a length determined by the Method B of JIS L 1015 (a corrected staple diagram method).

It is not necessary that the fine fiber is circular in cross section but it is allowable that it is non-circular (such as long circular, elliptic, star-shaped, alphabet-shaped including Y- or X-shaped and cross-shaped) in cross section.

It is preferable that such a fine fiber is contained in the fiber sheet at not less than 5 mass %, or more preferably not less than 10 mass %, so as to give an excellent ionic permeability. On the other hand, in view of the relation to the above-mentioned fibril fiber, it is preferably not more than 80 mass %, and more preferably not more then 50 mass %.

It is not necessary that fine fibers of one kind are used but it is allowable that fine fibers of two or more kinds are contained therein. When fine fibers of two or more kinds are contained as such, the total mass is preferably within the aforementioned range.

The separator of the present invention comprises a fiber sheet containing a fibril fiber and a fine fiber as aforementioned. Embodiments of the fiber sheet may include, for example, textiles, knitted goods, nonwoven fabrics and composite products thereof. Among them, nonwoven fabrics capable of being made thin are preferred. More preferably wet-laid nonwoven fabrics can be employed which have an excellent uniform fiber dispersibility, a resistance against short circuiting and a high reliability.

It is preferred that all of the constituents (for example, fibril fibers, fine fibers, etc.) for the separator of the present invention are not thermally fused, As a result of not being thermally fused as such, the separator is free from forming a coat whereby its ionic permeability is excellent.

The thickness of the separator is preferably not more than 50 μm, and more preferably 15 to 45 μm, so as to give an excellent ionic permeability. The weight per unit area of the separator is preferably 5 to 30 g/m² while the apparent density thereof is preferably 0.1 to 1.2 g/cm³.

With regard to the separator of the present invention, a fiber sheet is manufactured by conventional methods and the said fiber sheet may be used as the separator.

For example, a preferably suitable wet-laid nonwoven fabric can be manufactured as follows:

First, at least fibril fibers and fine fibers are prepared. Both fibril fibers and fine fibers are available in the market. Therefore, they are easily obtainable.

Next, those fibers are subjected to a conventional wet-laid web-forming method (such as horizontal long net web-forming method, inclined wire type short net web-forming method, circular net web-forming method, or long net and circular net-combination web-forming method) to form a fiber web. In the formation of the fiber web, a thickener may be added so as to maintain the uniformly dispersed state of the fibers, a surface-active agent may be added so as to improve the affinity of the fibers with water or a antifoaming agent may be added so as to remove foams generated upon stirring, etc.

Then the fiber web is dried to remove water whereupon a wet-laid nonwoven fabric can be prepared. The drying is carried out at the temperature at which the constituent fibers for the fiber web do not happen to melt.

Although the wet-laid nonwoven fabric thus prepared can be used as the separator, it is preferable that this wet-laid nonwoven fabric is further compressed using a calender or the like. By application of compression as such, it is possible that (1) the thickness is adjusted or made thin or uniform, (2) the fibril fiber is further fibrillated to give a more densified separator or (3) fibrils of the fibril fiber are closely contacted or adhered to improve the strength.

Upon applying the compression, the fiber sheet may be either heated or non-heated although the above-mentioned effect is readily achieved when heated. However, if heating is carried out to such an extent that the constituent fibers are melted, a coat is formed and the ionic permeability is deteriorated. Therefore, in the case of heating, it is necessary to heat at the temperature which is 20° C., or more preferably 30° C., lower than the melting temperature of a resin having the lowest melting temperature among constituent resins for fibers comprised in nonwoven fabrics (separators).

Another characteristic feature of the capacitor-manufacturing process according to the present invention resides in drying materials at the temperature which is higher than the boiling point of water but lower than the softening temperature of a resin having the lowest softening temperature among the constituent resins for the fibers contained in the aforementioned separator after the above-mentioned electrode group is fabricated from separators, current collector electrodes and electrodes. When the conventional separator is used in case of drying an electrode group at such a temperature, the separator is deteriorated whereby it has been quite often noted that the resulting separator is useless any more. However, when the specific separator as aforementioned is used, the separator is hardly deteriorated from which, in addition, water can be well removed, and its ionic permeability is excellent as well. As a result, it is now possible to easily, conveniently manufacture electric double-layer capacitors having a high withstand voltage, electric double-layer capacitors having a high energy density and electric double-layer capacitors having a high capacity.

It is preferred that electrode groups are dried at the temperature which is 50° C. or higher, or more preferably 60° C. or higher, than the boiling point of water. It is also preferred that the drying process is carried out at the temperature which is 20° C. or lower, or more preferably 30° C. or lower, than the softening temperature of a resin having the lowest softening temperature among the constituent resins for the fibers contained in the separator. For instance, when a specific separator consists of the above-mentioned fibril fibers and polyester fine fibers, the drying temperature is preferably about 150 to 220° C., or more preferably about 160 to 210° C.

The boiling point of water refers to a value obtained by a measurement using a Cottrell ebulliometer.

Briefly described below are processes for manufacturing the capacitors of the present invention.

At first, current collector electrodes, electrodes and specific separators as aforementioned are prepared. As to the current collector electrode, a thin metal plate such as an aluminum or platinum thin plate may be used. The electrode may be selected from those prepared, for example, by mixing activated carbon particles with an electrically conductive agent and an adhesive agent followed by subjecting to a green compact method, a rolling method, a painting method or a doctor blade method.

Then, layering of a current collector electrode, an electrode, a separator, an electrode and a current collector electrode in this order is repeated, or the layered product fabricated as such is rolled, to form an electrode group.

Following that, the electrode group is subjected to the above-mentioned drying conditions whereby the current collector electrode, the electrode and the separator are simultaneously dried.

Then, the resulting dried electrode group and an electrolyte are inserted into a case followed by sealing the case. As a result, the capacitor can be manufactured. The electrolyte may include, for example, an organic electrolyte obtained by dissolving propylene carbonate in tetraethylammonium tetrafluoroborate, an organic electrolyte obtained by dissolving propylene carbonate in tetraethyl phosphonium tetrafluroborate, etc. It is preferred that the electrolyte is impregnated in a vacuum.

DESCRIPTION OF THE PREFERRED EMBODIMENTS

Described below are examples of the present invention which are provided only for illustrative purposes, and not to limit the scope of the present invention.

EXAMPLES
(Manufacture of the Separator)

Experimental Example 1

Fibril fibers formed from para-type aromatic polyamide (Registered Trademark: KEVLAR, Du Pont; carbonizing temperature: not lower than 500° C.) and fine fibers formed from polyethylene terephthalate (fineness: 0.11 dtex, fiber length: 3 mm, melting temperature: 260° C., softening temperature: 253° C., cross section: circular) were prepared.

Next, a slurry containing the fibril fibers and the fine fibers at a mass ratio of 1:1 was formed and subjected to web-forming processes using an inclined wire type short net system to form a fiber web. Then this fiber web was dried by a hot-air circulating drier set to the temperature of 120° C. Thereafter, the dried fiber web was compressed (linear pressure: 4.7 kN/cm) by a pair of hot calenders set to the temperature of 220° C. to manufacture a compressed wet-laid nonwoven fabric (i.e. separator) having a weight per unit area of 20 g/m$^2$, a thickness of 25 μm and an apparent density of 0.8 g/m$^3$. The constituent fibril fibers for this separator contained the part where the fine fibers were in a bundle. Although the constituent fine fibers (formed from polyethylene terephthalate) for the separator were a bit adhered by pressure, they were thermally nonfused and, therefore, free from forming a coat.

Experimental Example 2

The procedures (i.e., fiber web formation, drying and compression with a pair of hot calenders) of Example 1 were repeated except that 50 mass % of polyethylene terephthalate fibers with a fineness of 0.77 dtex and a fiber length of 3 mm (melting temperature: 260° C.; softening temperature: 253° C.; cross section: circular) was used in place of the fine fiber of Example 1. As a result, a compressed wet-laid nonwoven fabric (i.e., separator) having a weight per unit area of 20 g/m$^2$, a thickness of 25 μm and an apparent density of 0.8 g/cm$^3$ was manufactured.

Experimental Example 3

The procedures (i.e., fiber web formation, drying and compression with a pair of hot calenders) of Example 1 were repeated except the use of 100% of fibril fibers formed from para-type aromatic polyamide as used in Example 1. As a result, a compressed wet-laid nonwoven fabric (i.e., a separator) having a weight per unit area of 20 g/m$^2$, a thickness of 25 μm and an apparent density of 0.8 g/cm$^3$ was manufactured.

Experimental Example 4

A fiber web manufactured in the entirely same manner as in Example 1 was dried by a hot-air circular drier set to the temperature of 120° C. Then the dried fiber web was compressed (linear pressure: 4.7 kN/cm) by a pair of hot calenders set to the temperature of 240° C. to manufacture a compressed wet-laid nonwoven fabric (i.e., separator) having a weight per unit area of 20 g/m$^2$, a thickness of 25μm and an apparent density of 0.5 g/cm$^3$. The constituent fibril fibers for this separator contained the part where the fine fibers were in a bundle. Although the constituent fine fibers (formed from polyethylene terephthalate) for the separator were a bit adhered by pressure, they were thermally nonfused and, therefore, free from forming a coat.

Experimental Example 5

A commercially available cellulose fiber separator (weight per unit area: 20 g/cm$^2$; thickness: 48 μm; apparent density: 0.41 g/cm$^3$) for the manufacture of a capacitor was prepared.

(Manufacture of Capacitor)

First, materials were prepared: an aluminum thin plate as a current collector electrode, a kneaded mixture (granular activated carbon, carbon black and polytetrafluoroethylene; prepared by rolling techniques) as an electrode and each product (separator) of the above-mentioned Experimental Examples 1 to 5 as a separator, respectively.

Then, layering of the current collector electrode, the electrode, the separator, the electrode and the current collector electrode in this order was repeated to form an electrode group.

Thereafter the electrode group was subjected to heating at 150° C. and 200° C. for 5 hours so that the current collector electrode, the electrode and the separator were simultaneously dried.

Then the dried electrode group was inserted in a coin cell type case, and impregnated in a vacuum with an electrolyte wherein tetraethylammonium tetrafluoroborate was dissolved in propylene carbonate. Thereafter the case was sealed to produce a capacitor (thus, capacitors 1, 2, 3, 4 and 5 were manufactured thereby, respectively).

In the meanwhile, the current collector electrode, the electrode and the separator of Experimental Example 5 were dried at 100° C. for 5 hours, at 200° C. for 5 hours and at 100° C. for 5 hours.

Next, layering of the current collector electrode, the electrode, the separator, the electrode and the current collector electrode in this order was repeated to form an electrode group. Then this electrode group was inserted in a coin cell type case, and impregnated in a vacuum with an electrolyte wherein tetraethylammonium tetrafluoroborate was dissolved in propylene carbonate. Thereafter the case was sealed to produce a capacitor (capacitor 6).

Then, each of the capacitors 1 to 6 was measured for its inner electric resistance. Simultaneously a voltage of 2.5 V was applied thereto at an atmospheric temperature of 60° C. and each capacitor was measured for its electric capacities at the initial stage, after 200 hours and after 300 hours. The results are shown in Table 1.

TABLE 1

|  |  |  | When dried at 150° C. | When dried at 200° C. |
|---|---|---|---|---|
| Capacitor 1 | Electric Capacity (F) | Initial Value | 1.31 | 1.35 |
|  |  | After 200 hours | 1.24 | 1.30 |
|  |  | After 300 hours | 1.21 | 1.29 |
|  | Inner Resistance (Ω) |  | 3.2 | 2.7 |
| Capacitor 2 | Electric Capacity (F) | Initial Value | short-circuited (in a state of short circuit in inner area) | |
|  |  | After 200 hrs |  |  |
|  |  | After 300 hrs |  |  |
|  | Inner Resistance (Ω) |  |  |  |
| Capacitor 3 | Electric Capacity (F) | Initial Value | 1.31 | 1.35 |
|  |  | After 200 hrs | 1.24 | 1.30 |
|  |  | After 300 hrs | 1.19 | 1.29 |
|  | Inner Resistance (Ω) |  | 3.8 | 3.3 |
| Capacitor 4 | Electric Capacity (F) | Initial Value | 1.31 | 1.35 |
|  |  | After 200 hrs | 1.24 | 1.30 |
|  |  | After 300 hrs | 1.21 | 1.29 |
|  | Inner Resistance (Ω) |  | 3.2 | 2.7 |
| Capacitor 5 | Electric Capacity (F) | Initial Value | 1.30 | short-circuited |
|  |  | After 200 hrs | 1.13 |  |
|  |  | After 300 hrs | 1.10 | (*) |
|  | Inner Resistance (Ω) |  | 3.2 |  |
| Capacitor 6 | Electric Capacity (F) | Initial Value | 1.35 | |
|  |  | After 200 hrs | 1.30 | |
|  |  | After 300 hrs | 1.29 | |
|  | Inner Resistance (Ω) |  | 3.1 | |

(*) in a state of short circuit in inner area

It is apparent from Table 1 that, when an electrode group was assembled followed by drying at the temperature of 150° C., each inner resistance of the capacitors 1 and 4 was relatively low although their electric capacities reduced a bit.

On the contrary, in the capacitor 2, it was short-circuited (in a state of short circuit in inner area) whereby it was unusable; in the capacitor 3, it was practically useless because of its high inner resistance; and, in the capacitor 5, it was unusable because of its significant decrease in electric capacity.

In case the electrode group was assembled followed by drying at the temperature of 200° C., the capacitors 1 and 4 were highly practical due to less decrease in electric capacity and due to a low inner resistance.

On the contrary, the capacitor 2 was short-circuited (in a state of short circuit in inner area) whereby it was unusable: the capacitor 3 was hardly used because of its high inner resistance as compared with the capacitors 1 and 4; and the capacitor 5 was unusable because it was short-circuited (in a state of short circuit in inner area).

With regard to the capacitor 6, although it showed a good electric capacity and inner resistance, each of the materials therefor was to be dried separately whereby the steps were complicated and manufacturing equipments required a big space.

On the contrary, the capacitors 1 and 4 were capable of being dried after assembling the electrode group whereby the steps were simple and a big space for manufacturing equipments was not needed and, further, it showed an equivalent or even higher electric capacity and inner resistance as compared with those of the capacitor 6 whereby it was appropriate in view of manufacture and properties.

ADVANTAGE OF THE INVENTION

In accordance with the processes for the manufacture of electric double-layer capacitors of the present invention, the specific separators are not deteriorated even when an electrode group is assembled from current collector electrodes, electrodes and the specific separators followed by drying for a long period (such as 5 hours or even longer) at the temperature not lower than the boiling point of water and lower than the softening temperature of a resin having the lowest softening temperature among constituent resins for fibers contained in the separator, whereby water can be successfully and well removed. Accordingly, it is now possible to make manufacturing devices (such as a glow box) compact and also to manufacture electric double-layer capacitors having a high withstand voltage, electric double-layer capacitors having a high energy density and electric double-layer capacitors having a high capacity in a simple manner without occupying much space.

Further, none of the constituents for the above separator is thermally fused whereby the separator is free from forming a coat. Therefore, the instant separator exerts an excellent ionic permeability, thereby facilitating the manufacture of electric double-layer capacitors having a higher capacity.

What is claimed is:

1. A process for manufacturing an electric double-layer capacitor, including the steps of inserting an electrolyte and an electrode group assembled from a current collector electrode, an electrode and a separator into a case and sealing the case, said process comprising the characteristic steps of:
(i) using, as the separator, a fiber sheet comprising a fiber having fibrils and formed from a resin having a melting or carbonizing temperature of not lower than 300° C. and a fine fiber having a fineness of not more than 0.45 dtex (decitex) and formed from a resin having a softening temperature of not lower than 200° C. and,
(ii) after assembling of the electrode group, drying the current collector electrode, the electrode and the separator at the temperature which is lower than the softening temperature of a resin having the lowest softening temperature among the constituent resins for the fibers comprised in the separator but not lower than the boiling point of water.

2. The process according to claim 1, wherein any of constituents for the separator is free of thermal fusion.

* * * * *